US008055446B2

(12) United States Patent
Byerly

(10) Patent No.: US 8,055,446 B2
(45) Date of Patent: Nov. 8, 2011

(54) METHODS OF PROCESSING MAGNETOTELLURIC SIGNALS

(76) Inventor: Kent A. Byerly, Seabrook, TX (US)

( * ) Notice: Subject to any disclaimer, the term of this patent is extended or adjusted under 35 U.S.C. 154(b) by 1128 days.

(21) Appl. No.: 11/546,164

(22) Filed: Oct. 11, 2006

(65) Prior Publication Data

US 2008/0091354 A1    Apr. 17, 2008

(51) Int. Cl.
    G01V 3/00    (2006.01)
    G01V 5/00    (2006.01)
(52) U.S. Cl. .................. 702/6; 702/7; 702/11; 250/253
(58) Field of Classification Search ................. 702/6, 7, 702/11, 13, 14, 16, 17, 57, 65–67, 70, 71, 702/73–78, 176, 183, 187, 189–191, 193, 702/197, 198; 324/335, 339, 345, 346, 347, 324/348, 350; 166/254.1, 254.2
    See application file for complete search history.

(56) References Cited

U.S. PATENT DOCUMENTS

| 2,243,182 | A |   | 5/1941  | Amy et al. ................... 250/20 |
| 2,677,801 | A | * | 5/1954  | Cagniard ..................... 324/350 |
| 3,514,693 | A |   | 5/1970  | Cagniard |
| 3,828,241 | A |   | 8/1974  | Horichi ........................ 323/22 |
| 3,986,207 | A |   | 10/1976 | Gerbel et al. ................... 360/6 |
| 4,047,098 | A | * | 9/1977  | Duroux ........................ 324/335 |
| 4,209,747 | A | * | 6/1980  | Huchital ...................... 324/338 |
| 4,286,218 | A | * | 8/1981  | Bloomquist et al. .......... 324/350 |
| 4,349,781 | A |   | 9/1982  | Vozoff ........................ 324/346 |
| 4,449,099 | A | * | 5/1984  | Hoehn ......................... 324/350 |
| 4,473,800 | A |   | 9/1984  | Warner ........................ 324/349 |
| 4,591,791 | A | * | 5/1986  | Bostick, Jr. ................... 324/350 |
| 4,617,518 | A |   | 10/1986 | Srnka ........................... 324/365 |
| 4,663,593 | A |   | 5/1987  | Nekut, Jr. ...................... 324/345 |
| 4,686,475 | A | * | 8/1987  | Kober et al. ................... 324/349 |
| 4,686,476 | A |   | 8/1987  | Ranganayaki ................. 324/350 |

(Continued)

FOREIGN PATENT DOCUMENTS

GB        2349222 A    10/2000

OTHER PUBLICATIONS

Robertson, R. Clark, The Effect of Wave Number Filtering on Synthetic Three-Dimensional Magnetotelluric Data, Proc.IEEE Session 10D3, pp. 289-290 (1989).

(Continued)

*Primary Examiner* — Jonathan Teixeira Moffat
(74) *Attorney, Agent, or Firm* — Keith B. Willhelm

(57) ABSTRACT

A method for processing magnetotelluric data to identify subterranean deposits is provided for. The data comprise the amplitude of alternating magnetic or electrical fields recorded over time in at least two vector components at one or more locations in an area of interest. Amplitude pulses are identified in the data, wherein the pulses are time segments comprising an amplitude peak meeting defined threshold criteria in at least one vector component. The pulses are filtered at a set of predetermined frequencies to separate amplitude data at each frequency from the remainder of the amplitude data in the pulses. The frequencies correspond to subterranean depths over a range of interest. Differential impedances ΔZ of the pulses at each frequency at each location are then statistically analyzed to determine a value correlated to the resistance of the earth at each frequency. The resistance values are indicative of the presence or absence of deposits at the corresponding subterranean depth at the location.

30 Claims, 3 Drawing Sheets

U.S. PATENT DOCUMENTS

| | | | | |
|---|---|---|---|---|
| RE32,563 | E | 12/1987 | Stolarczyk | 324/334 |
| 4,757,262 | A | 7/1988 | Bostick, Jr. | 324/350 |
| 4,792,761 | A * | 12/1988 | King et al. | 324/350 |
| 4,811,220 | A | 3/1989 | McEuen | 364/420 |
| 4,835,473 | A | 5/1989 | Bostick, Jr. | 324/357 |
| 4,845,503 | A | 7/1989 | Adam et al. | 342/448 |
| 4,893,286 | A * | 1/1990 | Cobb | 367/87 |
| 4,945,310 | A | 7/1990 | Jackson | 324/349 |
| 5,041,792 | A | 8/1991 | Thompson | 324/350 |
| 5,148,110 | A | 9/1992 | Helms | 324/323 |
| 5,327,089 | A | 7/1994 | Ouellette | 324/345 |
| 5,361,029 | A | 11/1994 | Rider et al. | 32/326 |
| 5,373,433 | A | 12/1994 | Lee et al. | 364/420 |
| 5,439,800 | A | 8/1995 | Thompson | 435/9 |
| 5,563,513 | A | 10/1996 | Tasci et al. | 324/359 |
| 5,564,082 | A | 10/1996 | Blonder et al. | 455/90 |
| 5,671,136 | A | 9/1997 | Willhoit, Jr. | 364/421 |
| 5,745,384 | A * | 4/1998 | Lanzerotti et al. | 702/191 |
| 5,770,945 | A * | 6/1998 | Constable | 324/350 |
| 5,777,478 | A | 7/1998 | Jackson | 324/348 |
| 5,781,436 | A | 7/1998 | Forgang et al. | 364/422 |
| 6,087,833 | A | 7/2000 | Jackson | 324/350 |
| 6,163,155 | A | 12/2000 | Bittar | 324/338 |
| 6,188,221 | B1 | 2/2001 | Van de Kop et al. | 324/337 |
| 6,191,587 | B1 | 2/2001 | Fox | 324/350 |
| 6,414,492 | B1 | 7/2002 | Meyer et al. | 324/344 |
| 6,462,549 | B1 * | 10/2002 | Curtis et al. | 324/323 |
| 6,466,021 | B1 * | 10/2002 | MacEnany | 324/350 |
| 6,559,645 | B2 | 5/2003 | Arndt et al. | 324/329 |
| 6,560,537 | B1 | 5/2003 | Matthews | 702/2 |
| 6,603,313 | B1 | 8/2003 | Srnka | 324/354 |
| 6,842,006 | B2 * | 1/2005 | Conti et al. | 324/350 |
| 6,944,495 | B2 * | 9/2005 | MacAdam et al. | 600/521 |
| 6,950,747 | B2 * | 9/2005 | Byerly | 702/6 |
| 7,019,528 | B2 | 3/2006 | Bittar | 324/337 |
| 7,023,213 | B2 | 4/2006 | Nichols | 324/348 |
| 2004/0196047 | A1 | 10/2004 | Fanini et al. | 324/339 |
| 2005/0264294 | A1 | 12/2005 | Constable | 324/348 |
| 2006/0038570 | A1 | 2/2006 | Constable | 324/334 |

OTHER PUBLICATIONS

Hill, David A., et al., , Chap. 47 ("Electric Field Strength") (13 pages) (CRC Press 1999). The Measurement, Instrumentation, and Sensors Handbook.

Lakkos, S., et at, An Adaptive System for the Estimation of the Magnetotelluric Impedence Tesnor and Its Application in Earthquake Prediction, Proc.IEEE Session , pp. 1209-13 (1992).

Robertson, R. Clark, The Effect of Wavenumber Filtering on Synthetic Two-Dimensional Magnetotelluric Date, Proc.IEEE Session , pp. 1056-1059 (1988).

* cited by examiner

METHODS OF PROCESSING MAGNETOTELLURIC SIGNALS

BACKGROUND OF THE INVENTION

The present invention relates to magnetotelluric surveys and, more particularly, to improved methods for processing magnetotelluric signals.

There are many different methods for locating hydrocarbon deposits and other natural resources in the earth's crust. Drilling test holes in an area of interest is the most direct method. Samples from various depths may be obtained and analyzed for evidence of commercially exploitable deposits. Test drilling, however, is extremely expensive and time consuming. Thus, it is rarely a practical first option for exploring unknown and unproven areas.

Seismic surveys are one of the most important techniques for discovering the presence of hydrocarbon deposits. A seismic survey is conducted by deploying an array of energy sources, such as dynamite charges, and an array of sensors in an area of interest. The sources are discharged in a predetermined sequence, sending seismic energy waves into the earth. The reflections from those energy waves or "signals" travel through the earth, reflecting or "echoing" off various subsurface geological formations. Inferences about the depth of those formations may be made based on the time it takes the reflection signals to reach the array of sensors.

If the data are properly processed and interpreted, a seismic survey can give geologists an accurate picture of subsurface geological features. Seismic surveys, however, only identify geological formations capable of holding hydrocarbon deposits. They do not reveal whether hydrocarbons are actually present in a formation. Moreover, the time and expense involved in conducting a seismic survey, while considerably less than that of test drilling, is nevertheless substantial.

Geological surveys also have been based on the detection and interpretation of magnetotelluric signals. Magnetotelluric radiation emanates from the earth and may be caused by current flow in the upper layers of the earth's crust. The current flow in turn creates electromagnetic fields adjacent to, but above the earth's surface that are directly related to the resistivity of the earth through which the induced current is flowing. That resistivity in turn may be used to infer the presence or absence of valuable deposits. For example, areas of increased resistivity may indicate the presence of hydrocarbons since hydrocarbons are poor conductors.

Magnetotelluric surveys also are much less expensive than seismic surveys. There is no need to install an array of sources and receivers across what may be a very substantial area to be surveyed as in seismic surveying. Instead, magnetotelluric detection equipment and recorders may be carried across the survey area by truck, all-terrain vehicle, helicopter, or other mode of transportation suitable for the survey area.

Despite the considerable theoretical and practical advantages of magnetotelluric surveying, however, its promise has not been fully realized, so much so that such surveys are often met with the skepticism normally reserved for water witching, divining and the like. That perception has been created in large part because many conventional magnetotelluric methods are based on converting magnetotelluric signals into audio signals that are then aurally interpreted by an operator. Obviously, the reliability and consistency of such methods, to the extent they exist at all, is dependent on the ability of the operator to hear differences in the signals and to properly interpret them.

Other methods have focused on detection and interpretation of the DC component of magnetotelluric fields. For example, U.S. Pat. No. 4,945,310 to J. Jackson et al. discloses methods based on measuring the potential created across a pair of spaced electrodes. The AC component of the potential is filtered out, leaving a DC potential the magnitude of which is functionally related to the subsurface lithology at the detection site. U.S. Pat. No. 4,473,800 to B. Warner and U.S. Pat. No. 5,770,945 to S. Constable also disclose methods of detecting and analyzing the DC component of magnetotelluric signals using dipole antennas that detect both the magnetic and electrical components of magnetotelluric fields.

The applicability of such methods, however, is severely limited. The presence and strength of DC signals is dependent on the time of day and weather conditions. For example, they are extremely difficult to detect reliably during overcast periods and during rainstorms, and they are almost undetectable at night. More importantly, however, the DC component of magnetotelluric fields has no correlation to depth. Thus, while the DC component may be analyzed to make inferences about the overall resistivity of the earth below a survey location, it is impossible to deduce the resistivity of the earth at specific depths, or to detect differences in resistivity at different depths.

Other methods focus on detecting and interpreting the extremely low frequency AC component of magnetotelluric signals. Such signals typically are below about 3 kHz. There is a direct relationship between a given magnetotelluric frequency and subsurface depth. Thus, the resistivity of the earth at a particular depth is related to the amplitude of the signal at a corresponding frequency. For example, the resistance of a shallow subsurface formation can be measured by detecting and analyzing higher frequency magnetotelluric signals. The resistance of deeper formations can be measured by analyzing lower frequencies.

For example, U.S. Pat. No. 5,777,478 to J. Jackson discloses methods of detecting and analyzing the AC component of magnetotelluric signals. Those methods entail modulating and then demodulating a magnetotelluric signal with a sweep oscillator. The sweep oscillator beats the received signal with a generated signal to generate tuned signals at various frequencies. The tuned signals then are converted to pulses by reference to a threshold value. That is, whenever the tuned signal exceeds a predetermined threshold value a pulse is generated. The number of pulses over a given time period, what is referred to as the "pulse density", is said to provide a measure of conductivity relative to other depths and locations in the survey area.

Magnetotelluric signals, however, are extremely weak and typically are very noisy. Prior art methods have not provided effective methods for improving the quality of magnetotelluric signals, i.e., their signal to noise ratio. Jackson '478, for example, teaches the use of a relatively large bandwidth low-pass filter. Such filters pass a relatively large spectrum and quantity of noise along with the signal to be analyzed.

Jackson '478 also bases its analysis of magnetotelluric signals on "snap shots" of the data. That is, it suggests that the tuned signals generated at each location should not be maintained for long periods of time so as to avoid any fluctuations in the overall strength of the received signal that might introduce unnecessary error in the survey. At the same time, however, the accuracy of the overall survey depends on an unstated, though faulty assumption that the received signals are relatively constant, since data are being collected and analyzed from various locations in the survey at different times. Moreover, by relying on "snap shots" of fluctuating signals, the results of such methods are difficult to replicate from survey to survey.

Thus, to date there has been little success in systematically analyzing magnetotelluric signals despite the availability of quiet detection and recording equipment and efficient and powerful digital computers. Such equipment makes it possible to easily acquire and process large amounts of data. It is believed, therefore, that the lack of success in large part derives from the inability of the prior art to recognize the essentially chaotic nature of magnetotelluric signals and to construct effective models for isolating and identifying meaningful data in magnetotelluric signals.

Methods which do appreciate that fact are disclosed in U.S. Pat. No. 6,950,747 to K. Byerly. Byerly '747 discloses a method of processing magnetotelluric signals to identify subterranean deposits. Magnetotelluric data from an area of interest are filtered at a set of predetermined frequencies to separate the amplitude data at each frequency. The frequencies correspond to subterranean depths over a range of interest. Amplitude peaks in the filtered data are identified and analyzed to determine a value correlated to the resistance of the earth at each frequency.

While the methods disclosed in Byerly '747 represent a significant advance over other prior art methods, conventional methods of processing magnetotelluric data have yet to gain substantial commercial acceptance or widespread use.

An object of this invention, therefore, is to provide improved methods for conducting geological surveys and, more particularly, methods that are relatively inexpensive as compared to test drilling and seismic surveys and yet still accurately identify the presence of hydrocarbons.

A more specific object of the subject invention is to provide improved methods for processing magnetotelluric signals that may be processed by conventional digital computers and that do not rely on an operator to distinguish differences in a magnetotelluric signal.

It also is an object to provide such methods that more effectively remove unwanted noise and identify and analyze meaningful components of magnetotelluric signals.

Another object of this invention is to provide such methods that more accurately and reliably reflect the relative resistivity of subsurface geology across a survey area.

Yet another object is to provide such methods wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides for methods of processing magnetotelluric data to identify subterranean deposits. The data comprise the amplitude of alternating magnetic or electrical fields recorded over time in at least two vector components at one or more locations in an area of interest. Amplitude pulses are identified in the data, wherein the pulses are time segments comprising an amplitude peak meeting defined threshold criteria in at least one vector component. The pulses are filtered at a set of predetermined frequencies to separate amplitude data at each frequency from the remainder of the amplitude data in the pulses. The frequencies correspond to subterranean depths over a range of interest. Differential impedances $\Delta Z$ of the pulses at each frequency at each location are then statistically analyzed to determine a value correlated to the resistance of the earth at each frequency. The resistance values are indicative of the presence or absence of deposits at the corresponding subterranean depth at the location.

The differential impedances of a given pulse x, $\Delta Z_x(f)$, are defined as follows:

$$\Delta Z_x(f) = \left( A_n \frac{E_{x,n}(f)}{H_{x,n}(f)} + A_{n+1} \frac{E_{x,n+1}(f)}{H_{x,n+1}(f)} + \ldots + A_N \frac{E_{x,N}(f)}{H_{x,N}(f)} \right) - \left( A_m \frac{E_{x,m}(f)}{H_{x,m}(f)} + A_{m+1} \frac{E_{x,m+1}(f)}{H_{x,m+1}(f)} + \ldots + A_M \frac{E_{x,M}(f)}{H_{x,M}(f)} \right)$$

where $\Delta Z_x(f)$ is the differential impedance of pulse x;

$E_{x,n}(f)$ through $E_{x,N}(f)$ and $E_{x,m}(f)$ through $E_{x,M}(f)$ are the recorded or synthetic electric fields for vector components n through N and m through M of pulse x;

$H_n(f)$ through $H_{x,N}(f)$ and $H_{x,m}(f)$ through $H_{x,M}(f)$ are the recorded or synthetic magnetic field for vector components n through N and m through M of pulse x;

$\frac{E_{x,n}(f)}{H_{x,n}(f)}$ through $\frac{E_{x,N}(f)}{H_{x,N}(f)}$ and $\frac{E_{x,m}(f)}{H_{x,m}(f)}$ through $\frac{E_{x,M}(f)}{H_{x,M}(f)}$ are the impedances for vector components n through N and m through M of pulse x; and $A_n$ through $A_N$ and $A_m$ through $A_M$ are complex scaling factors applied to the impedances for vector components n through N and m through M of pulse x.

It will be appreciated that the magnetotelluric data processing methods are better able to remove unwanted noise, to provide values correlating to subsurface resistivity at defined depths, and ultimately, to render a more accurate indication of the presence or absence of valuable deposits in the survey area.

The subject invention also provides for a method for collecting magnetotelluric signals. The method comprises receiving magnetotelluric signals in at least two vector components. Amplitude peaks meeting defined threshold criteria in at least one said vector component and detected. The magnetotelluric signals in all vector components are then recorded over a defined time segment in response thereto. It will be appreciated that the novel data collection methods provide data which may be analyzed to yield differential impedance values correlating to resistivity values with lesser amounts of memory and disk space.

The collected data may be processed by any suitable method, but it will be appreciated that they preferably are processed through the novel data processing methods disclosed herein. Similarly, the data processed by the novel processing methods preferably, but need not be collected by the novel signal collection methods.

DESCRIPTION OF ILLUSTRATIVE EMBODIMENTS

The subject invention is directed to improved methods for processing magnetotelluric signals to identify subterranean deposits of hydrocarbons and other natural resources having resistivities contrasting with the earth in which they are located. More particularly, the novel methods comprise the step of obtaining magnetotelluric data from an area of interest. The magnetotelluric data comprise the amplitudes of alternating magnetic or electrical signals recorded over time in at least two vector components at one or more locations in an area of interest. Those signals comprise information indicative of subsurface resistivities in the survey area as well as unwanted noise. The methods of the subject invention are designed to process such information to remove unwanted noise, to provide values correlating to subsurface resistivity at defined depths, and ultimately, to render a more accurate indication of the presence or absence of valuable deposits in the survey area.

Collection of Magnetotelluric Data

The amplitude of magnetotelluric signals is detected and monitored at various locations in an area of interest. For example, a two-dimensional magnetotelluric survey may be conducted along a survey line traversing an area of interest. Detection and recording equipment may be mounted on a truck, all-terrain vehicle, helicopter, or vehicle, or simply carried from one location to the next, as is suitable for the terrain in the survey area. Magnetotelluric signals are recorded over time at each location on the survey line.

A two-dimensional survey will generate a profile of the subsurface resistivity below the survey line. More commonly, however, the data will be recorded at various locations across a defined area. The data then may be gathered and analyzed as a series of two-dimensional surveys, or assimilated into a three-dimensional survey that will provide a profile of the subsurface resistivity below the survey area.

In accordance with the subject invention, the magnetotelluric data comprise the amplitudes of alternating magnetic or electrical signals recorded over time in at least two vector components. Preferably, the magnetotelluric data comprise the amplitude of the magnetic field recorded over time, and synthetic electric field data are generated based on the recorded magnetic field data.

Figure 1:
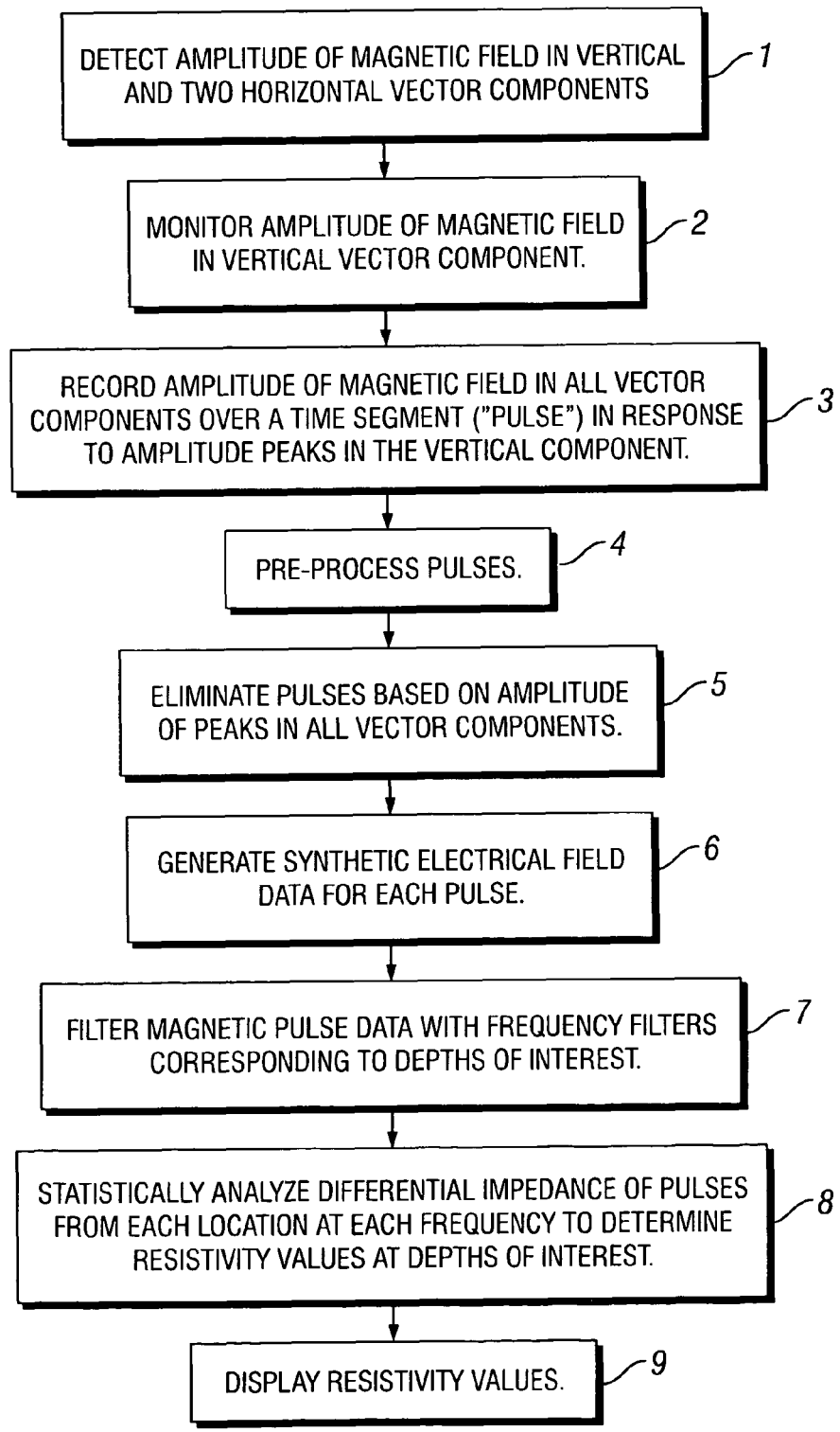
FIG. 1 is a schematic diagram of a preferred embodiment of the methods of the subject invention showing a sequence of steps for processing magnetotelluric signals to determine the relative resistivity of subsurface geology in a survey area.

By way of example, a preferred embodiment of the methods of the subject invention is shown in the flow chart of FIG. 1. For example, as shown in step 1, the amplitude of alternating magnetic signals is detected in a vertical and two horizontal components oriented orthogonally to each other. Magnetotelluric signals may be detected by conventional equipment commonly employed for such purposes. Typically, those systems will comprise a magnetometer coil or some other antenna system capable of receiving magnetotelluric signals.

In this preferred embodiment, the antenna system comprises three orthogonally oriented antennas. More specifically, the first antenna is aligned horizontally to the earth's surface for detection of the magnetic field in a vertical vector component. The second antenna is aligned vertically to the earth's surface and with the earth's magnetic field for north-south detection. The third antenna is aligned vertically to the earth's surface and perpendicular to the second antenna for detection of the magnetic field in an east-west vector component.

As described in further detail below, the magnetic field is detected and recorded in each of those vector components for further processing. Since measurement of electrical fields can be very problematic due to manmade noise, the preferred process shown in FIG. 1 relies on recorded magnetic field data. An estimated electrical field based on the recorded magnetic field will be generated for each vector component. The subject invention, however, contemplates detecting and recording the amplitude of the electrical field and generating a synthetic magnetic field, as well as detecting and recording the amplitudes of both the magnetic and electric fields.

Similarly, the subject invention contemplates obtaining data in at least two vector components, and orthogonally oriented vertical and horizontal vectors as described above are preferred. The data may be collected in only two vector components, or in more than three. As will be appreciated from the discussion that follows, however, at least two vector components are needed in order to analyze differential impedances. Toward that end, orienting three antennas orthogonally and in alignment with the earth's magnetic field is believed to enhance the analysis of differential impedances, but other orientations may be used. The angular displacement of the vector components relative to each other, however, should be sufficiently large so as to enhance the differential impedance between the vector components.

Moreover, magnetotelluric signals are typically weak, and therefore, preferred systems will feed the signals from the antennas into a high gain amplifier. The signals then are preferably converted to a digital format by an analog-to-digital (A/D) converter, and preferably after first passing the amplified signals through a low-pass filter to remove noise and prevent aliasing effects caused by the analog-to-digital converter.

Recordation of Pulse Data

Further in accordance with the subject invention, pulses are identified in the data. Those pulses are time segments within the data which include an amplitude peak meeting defined threshold criteria in at least one of the vector components. The pulses preferably are defined in real time by monitoring the amplitude of incoming signals in at least one vector component and recording the magnetotelluric signals in all vector components over a time segment in response to the detection of amplitude peaks meeting defined threshold criteria in the monitored vector component.

For example, as shown in step 2 of FIG. 1, the amplitude of signals from antenna 1, which detects the vertical vector component of the magnetic field, is monitored. When an amplitude peak in the vertical component meets predefined threshold criteria, such as minimum and maximum amplitude values, amplitude data are collected and saved synchronously from all three antennas over a predefined time period, as shown in step 3.

While the invention is not defined in terms of any particular explanation as to the origin thereof, pulses are believed to reflect electrical current surges originating deep within the crust. The object of setting thresholds is to collect a statistically meaningful sample of those relatively unusual events. Lower amplitude background noise and extremely high amplitude peaks caused by local events, such as lightning strikes traveling near the surface, preferably are excluded from the analyzed data. Thus, the thresholds may be based on various statistical analyses, such as percent deviation or standard deviation units from a mean or median of the absolute value or the root mean square of the amplitude or power level. Threshold criteria of approximately 6 standard deviation units (sigma) from the absolute value of the mean amplitude level have been found to provide satisfactory results. Ultimately, however, appropriate threshold criteria may be determined and optimized by surveying a known location, processing the data, and comparing the effect of various thresholds in matching the processed data with known conductivity studies, such as measured resistivity and spontaneous potential curves.

The time period over which a pulse event is recorded generally will be from about 100 to about 200 milliseconds. Thus, each segment or pulse includes an amplitude peak as well as data immediately preceding and following the peak so as to provide a full account of the peak event without including excessive data that ultimately will not enhance the reliability of the process.

The pulse typically will be recorded at frequencies from 0 to 44 kHz as this covers the typical depths of interest. The range of temporal response, however, may be varied if desired. For example, it may be extended to investigate greater depths or narrowed to focus on a smaller range of depths. Most magnetotelluric signals of interest will occur at frequencies below about 3 kHz.

The pulse event may be recorded by analog devices if desired and an analysis of continuous data made. As a practical matter, however, the pulses typically will be sampled, for example by recording the pulses with a digital recorder. The sampling rate should be substantially greater than the highest frequency of interest in the signal. That assists in preventing the effects of aliasing created when the analog signal is converted to sampled data. At a minimum, as suggested by Nyquist, it should be no less than twice the highest frequency of interest. Preferably, the sampling is conducted at rates several times the highest frequency of interest. Thus, sampling preferably is conducted as high as about 64 kHz, even when the investigated depths correspond to lower frequencies, but no lower than about 6 kHz.

The rate of pulse collection will depend on the atmospheric conditions and the value of the pre-defined threshold criteria. Observed pulse rates can vary from 6/min to 0.1/min. The number of pulses which should be collected is largely determined by the preferences of the investigator, but from about 400 to about 1,000 pulses should be sufficient to reliably process and interpret most data sets.

It has been observed that satisfactory results also may be obtained by coordinating the pulse collection rate and the threshold criteria. For example, an adaptive threshold may be established by setting the threshold criteria either higher or lower than expected, and then adjusting them until a desired collection rate is achieved. When using this approach it has found that a collection rate of from about 2 to about 3 pulses/minute provides a sufficiently large and reliable population of pulses for subsequent analysis.

It also will be appreciated that there are a variety of systems for receiving, converting, and recording magnetotelluric signals that are known to workers in the art and that may be used to advantage in the subject invention. Because magnetotelluric signals are inherently weak and noisy, it is preferred that relatively quiet equipment be used so as to inject as little system noise as possible into the signal and to ensure detection of the signal. Typical laptop computers generally will be sufficient for data collection purposes. The precise construction or operation of such systems, however, is not part of the subject invention, as the novel methods may be applied to magnetotelluric data obtained by any suitable system.

Generally, there is no need to store data in the computer that do not fall within a pulse, and by not doing so it is possible to save large amounts of memory and disk space. It will be appreciated, however, that all of the data during an observation period may be recorded and that time segments may be defined in the recorded data if storage and memory is not an issue or if a complete record is preferred for other reasons. Likewise, as described in further detail below, less stringent criteria may be applied in recording pulses with the expectation that additional criteria will be applied in some or all of the vector components to limit the number of recorded pulses which will be processed for interpretation.

Similarly, while the preferred method described herein contemplates storage of magnetotelluric pulse data for subsequent processing, systems may be devised for processing the pulses in more or less real time so that the signals may be interpreted, in whole or in part, in the field. Such systems may be preferred as they may provide insights useful in designing the survey itself or in selecting the parameters to be applied in further processing the data for interpretation.

Pre-Processing of Pulse Data

The pulse data preferably are processed by various means to enhance their ultimate analysis as shown in step 4 of FIG. 1. For example, the pulses may be filtered to remove 60 htz signals and harmonics thereof as such frequencies are the most common source of noise. The pulses may also be filtered to remove frequencies corresponding to depths outside a range of interest by Fourier, linear FIR, band or other frequency filters. If the pulses are to be subjected to a Fourier transform, they preferably are windowed, for example by a Hamming window, to shape the ends thereof and avoid mathematical artifacts such as the Gibb's phenomenon.

Time alignment of the peaks also will enhance the accuracy of subsequent statistical analyses of the pulses. That is, a peak may be defined as occurring at time t when the slope of the voltage-time plot (dv/dt) changes from positive to negative. Time alignment essentially resets the time t for each pulse event as occurring at a nominal time $t_o$.

Depth resolution may be increased by interpolating, or over-sampling each pulse to a higher sampling rate. Since the data are collected in multiple vector components using different antennas, if the antennas are not adequately matched, the data also should be calibrated and equalized to account for any significant differences therein.

Also, as noted previously, signals are recorded over time at various locations in the survey, and each location in the survey usually will be sampled at different times with equipment being transported from location to location. Thus, there may be variations in the amplitude data from location to location that are unrelated to subsurface resistivities. Such variations may result from changes in the magnetotelluric field over time, temperature differences, or inadvertent changes in the orientation of the antenna. Thus, the amplitude data preferably are normalized across all locations of interest in the survey. While normalization is not necessary for processing and statistically analyzing the data, it does assist in the interpretation of any subsequent visual display of the processed data, such as a display of resistivity across a depth-location plot.

A normalization factor may be based, for example, on the signal at the frequency corresponding to zero depth. In theory, the resistivity of the earth's surface, i.e., baseline "noise" level should not vary substantially as a function of location. Thus, assuming that a sufficiently large number of pulses are collected such that variations in the magnetotelluric signal are averaged out, any differences observed in the magnetotelluric frequency corresponding to the surface (zero depth) in different locations should be attributable to variations unrelated to subsurface resistivities. Those variations may be substantially eliminated by applying a factor to the data for each location that will normalize the signal across all locations at zero depth.

The signal for each location, therefore, preferably is filtered at the frequency corresponding to zero depth and the amplitude at that frequency is analyzed. Preferably, the normalization factor is based on the total power recorded at the zero-depth frequency over the sampling period, as that measure tends to average out variations in amplitude over time. For example, the data at each location could be divided by the total power at that location. Alternately, the normalization could be based on the peak amplitude or another statistical measurement of the amplitude at zero depth. Normalization also could be based on analysis of the signal at frequencies corresponding to other depths, e.g., a frequency of 100 Hz which for practical purposes corresponds to infinite depth. It will be appreciated, however, that suitable normalization factors may be derived by other methods consistent with enhancing the display of processed data.

In accordance with further preferred aspects of the subject invention, the pulses have an amplitude peak meeting defined threshold criteria in other vector components. For example, as shown in step 5 of FIG. 1, pulses are eliminated based on the amplitude of peaks in all of the vector components. More specifically, pulses are eliminated in which the amplitude of the vertical and the horizontal components fails to meet defined threshold criteria. Only those pulses which meet all criteria are retained for subsequent processing as described below.

This may be accomplished by horizontally mapping the pulses, that is, the pulses are sorted by peak amplitude polarization. For example, a given pulse may have a peak amplitude in the vertical component that is positive (+), a peak amplitude in the N-S horizontal component that is negative (−), and a peak amplitude in the E-W horizontal component that is positive (+). Assuming three vector components, there are eight possible polarization sets for the pulses: 1={+,+,+}; 2={−,+,+}; 3={−,−,+}; 4={+,−,+}; 5={+,+,−}; 6={−,+,−}; 7={−,−,−}; and 8={+,−,−}. Polarization set 7 is currently used, and peaks having all other polarization sets are eliminated. It is believed, however, that other polarization sets or combinations thereof may be retained for subsequent processing if desired or depending on geological constraints or coil winding specification. For example, if the antenna coils had been wound in the reverse direction, polarization set 1, {+,+,+} would have yielded identical results.

The pulses which meet the defined polarization set criteria then are analyzed in view of any additional criteria for the vertical component or defined criteria for horizontal components. Pulses in which the amplitudes do not meet defined threshold criteria are eliminated.

Threshold criteria designed to eliminate pulses which do not have significant peaks, or have excessively large peaks of the same polarity in each vector component have provided good results. As with other threshold criteria discussed above, the horizontal component thresholds may be based on various statistical analyses, such as percent deviation or standard deviation units from a mean or median amplitude or power level. Horizontal threshold criteria of from zero to about 20 sigma from the mean absolute value of the amplitude level have been found to provide satisfactory results, and other appropriate and optimal criteria may be determined by comparing processed data with known conductivity studies.

In the illustrated method, pulses were recorded in response to meeting threshold criteria in the vertical component. Recordation, however, may be triggered by alternate or additional criteria in other vector components. It also will be appreciated that if confidence in the reliability of threshold criteria is sufficiently high, the criteria may be applied while monitoring magnetotelluric signals and only those pulses which meet all defined criteria for all vector components may be recorded.

Generation of Synthetic Electric Field Data

In order to perform an analysis of differential impedances, as described in further detail below, it is necessary to compare magnetic and electric field data for a pulse. Thus, the subject invention contemplates recording both the magnetic and electric fields. Measurement of electrical fields, however, can be very problematic due to manmade noise. Thus, the subject invention preferably records magnetic field data and generates synthetic electric field data as shown in step 6 of FIG. 1. Preferably, the synthetic electric field data are generated by transforming a unit electrical impulse with a Fourier transform, generating low order estimates of the frequency response of recorded magnetic pulse data, and multiplying the Fourier transform of the processed unit pulse by the low order estimates.

More specifically, a unit electrical impulse function, i(t), is defined where the unit impulse is equal to 1 at time zero and equal to zero at all other times. The unit impulse preferably is pre-processed, i.e., frequency filtered, windowed, and interpolated, in the same manner as were the recorded magnetic pulses. The processed unit pulse is then subjected to a Fourier transform or any other algorithm suitable for generating the amplitude of the processed unit pulse over a range of frequencies analogous to the filtering of the recorded magnetic pulses described below. Let I(f) be the filtered unit impulse i(t) as a function of frequency.

Low order estimates of the frequency response of the recorded magnetic pulses, in each of their vector components, are then generated. Such estimates may be generated by using a filter modeling technique, such as Prony's method, or any of the numerous known algorithms which accomplish the same end. The magnetic frequency response estimate for vector component n of pulse x may be represented as $\hat{H}_{x,n}(f)$.

The transform of the unit pulse is then multiplied by the low order estimates of the magnetic field $\hat{H}_{x,n}(f)$. The frequency-dependant synthetic electric field data may be represented as $E_{x,n}(f)$, where n is a vector component of pulse x, which is equal to I(f) multiplied by the low order estimates of the magnetic field $\hat{H}_{x,n}(f)$.

Filtering of Pulses

In accordance with the subject invention, the recorded magnetotelluric pulse data are filtered at a set of predetermined frequencies to separate amplitude data at each frequency from the remainder of the amplitude data. The predetermined frequencies correspond to subterranean depths over a range of interest. The frequency filters also greatly improve the signal to noise ratio. Thus, it is possible to identify and analyze data corresponding to particular depths in the survey area and to do so with greater accuracy.

For example, as shown in step 7 of the preferred process shown in FIG. 1, the processed magnetic pulses are filtered with frequency filters which correspond to the depths of interest. More specifically, the pulses are filtered by transforming the data from the amplitude-time domain to the magnitude-phase/frequency domain using a fast Fourier transform, thereby defining frequency windows, $\Delta f$, which correspond to particular depths at a particular location.

While hard-wired frequency filters are known and may be suitable, the filters used in the novel processes, like a fast Fourier transform, preferably are a series of processing steps, typically including one or more mathematical functions, that may be encoded into digital computers for processing of the data. There are a number of well known rational polynomial functions that may be used alone or in combination with other functions to separate the data for a particular frequency from the data set as a whole, and in general those functions and processes may be used as frequency filters in the novel methods. Linear phase filters may be used. Such filters generate no phase distortion, i.e., they have constant time delay versus frequency. Finite impulse response (FIR) filters inherently preserve the phase of the signal and, therefore, also may be used to advantage in the novel methods. FIR filters, however, are extremely complex, and so they require a relatively large amount of computational resources. A combination of forward and a reverse infinite impulse response (IIR) filter at each frequency of interest also may be used. By using forward and reverse IIR filters the signal's phase is undistorted. IIR filters also are far less complex than FIR filters and data may be processed through them more quickly.

The range of frequencies analyzed and the size of the frequency windows $\Delta f$ are determined by the range of depth to be analyzed and the desired depth resolution for the survey. For example, surveys designed to detect hydrocarbon deposits generally will focus on depths of from about 500 to about 20,000 feet. The depth range selected for a particular survey, however, will be dependent on a number of factors, primarily on the depths at which deposits may be expected and the depths to which drilling may be extended. Likewise, the depth resolution of the survey may be adjusted as desired. Typically, the data will be analyzed at intervals of from about 5 to about 20 feet. Higher resolutions increase the likelihood of detecting valuable deposits. They require, however, correspondingly greater computation time and expense. Additionally, the data may be filtered using somewhat larger frequency windows $\Delta f$ to derive computed values and then values may be interpolated between computed values. That will allow the resolution of the filter to be enhanced to a smaller, nominal frequency window $\Delta f$. It will be appreciated, therefore, that the range and resolution of the survey is a matter of preference as dictated by a number of geological, practical, and economic considerations well known to workers in the art.

The frequency that corresponds to each of the depths to be analyzed is derived from a frequency-depth function. The frequency to depth relationship for magnetotelluric signals is dependent on the Earth's resistivity and electrical properties for a particular area. Thus, the depth corresponding to a particular frequency will vary from location to location. Preferably, therefore, the frequency-depth function will be based on empirically determined resistivities in the survey area, such as may be derived from test or existing wells.

The variation from area to area, however, usually is not so great that for many purposes an approximate or a more or less typical frequency-depth function may be used. Empirical data for various locations have been reported in the literature and a suitable frequency-depth function for the "typical" case may be derived therefrom. An approximate frequency-depth function also may be derived from conventional skin effect conductivity analyses. Such approximate functions also may be adjusted to more closely resemble the actual frequency-depth function for a survey area by identifying formations and then comparing the surveyed depth of the formation to what is known about the depth of the formation through wells or seismic data.

The order and bandwidth of such filters may be defined in accordance with well known principles. For example, higher order filters have less skirt and provide more effective filtering for a given bandwidth, but are more complex and require more computational resources. All of the frequency filters may have the same bandwidth. Preferably, however, the bandwidth of the filters will approximate a desired variance from their corresponding depth. That is, the center frequency for a filter will correspond to a particular depth of interest, and the bandwidth will be selected to pass frequencies corresponding to a more or less constant variance from that target depth. Since the frequency-depth function is not linear, that means the bandwidth will vary for each center frequency. At higher center frequencies (shallower depths), a slight change in depth corresponds to a relatively large change in frequency. The bandwidth for higher frequencies, therefore, will be relatively large. Likewise, at lower frequencies (deeper depths), where the change in frequency as a function of depth is relatively small, the bandwidth will be smaller.

Analysis of Pulses

It is believed that differential impedances of pulses in a magnetotelluric signal at a given frequency are indicative of the resistivity of the earth at the depth corresponding to that frequency. Thus, and in accordance with the subject invention, differential impedances $\Delta Z$ of the pulses at each frequency and location are statistically analyzed to determine a value correlated to the resistance of the earth at each frequency and location. Values closely correlated to resistance have been derived based on various differential impedances and statistical analyses thereof.

For example, as shown in step 8 of FIG. 1, differential impedances of pulses from each location are statistically analyzed at each frequency to determine resistivity values at the depths of interest. Preferably, the filtered magnetic pulse data and synthetic electric field data are normalized based on peak amplitude so enhance the reliability of the statistical analysis.

A general definition for differential impedances useful in the subject invention is shown below, where in the differential impedance of a given pulse x, $\Delta Z_x(f)$, is defined as follows:

$$\Delta Z_x(f) = \left( A_n \frac{E_{x,n}(f)}{H_{x,n}(f)} + A_{n+1} \frac{E_{x,n+1}(f)}{H_{x,n+1}(f)} + \ldots + A_N \frac{E_{x,N}(f)}{H_{x,N}(f)} \right) - \left( A_m \frac{E_{x,m}(f)}{H_{x,m}(f)} + A_{m+1} \frac{E_{x,m+1}(f)}{H_{x,m+1}(f)} + \ldots + A_M \frac{E_{x,M}(f)}{H_{x,M}(f)} \right)$$

where
$\Delta Z_x(f)$ is the differential impedance of pulse x;
$E_{x,n}(f)$ through $E_{x,N}(f)$ and $E_{x,m}(f)$ through $E_{x,M}(f)$ are the recorded or synthetic electric fields for vector components n through N and m through M of pulse x;
$H_{x,n}(f)$ through $H_{x,N}(f)$ and $H_{x,m}(f)$ through $H_{x,M}(f)$ are the recorded or synthetic magnetic field for vector components n through N and m through M of pulse x;

$$\frac{E_{x,n}(f)}{H_{x,n}(f)} \text{ through } \frac{E_{x,N}(f)}{H_{x,N}(f)} \text{ and } \frac{E_{x,m}(f)}{H_{x,m}(f)} \text{ through } \frac{E_{x,M}(f)}{H_{x,M}(f)}$$

are the impedances for vector components n through N and m through M of pulse x; and
$A_n$ through $A_N$ and $A_m$ through $A_M$ are complex scaling factors applied to the impedances for vector components n through N and m through M of pulse x.

It will be appreciated, therefore, that the differential impedance of a pulse x, $\Delta Z_x(f)$, may be calculated in various different ways. For example, it may be based on differences between the impedance of the vertical vector component and the impedance of a horizontal vector component or two or more horizontal vector components. More generally, it may be based on differences between any one or combination of vector components and any other one or combination of vector components. The vector components may be accorded equal weight, or they may be weighted accorded to scaling factors A. Currently, it has been observed that a differential impedance based on the differences between the vertical component and the E-W horizontal component, equally weighted, has provided excellent results. This preferred differential impedance may be represented as set forth below:

$$\Delta Z_n(f) = \frac{E_{x,e-w}(f)}{H_{x,e-w}(f)} - \frac{E_{x,v}(f)}{H_{x,v}(f)}$$

The statistical analysis of the differential impedance may incorporate a variety of conventional statistical analyses. Since many of the pulses may reflect excessive amounts of noise, or otherwise may represent an aberration, and the analysis preferably will include operations designed to eliminate such pulses from the data set. For example, it has been observed that values more closely correlated to resistivity may be obtained by eliminating pulses with relatively high differential impedances. Thus, an upper threshold and, if desired, a lower threshold may be set, and only those pulses having differential impedances within the thresholds will be subjected to further analysis.

For example, excellent results have been obtained by first determining the average differential impedances of the pulses over a range of frequencies $\Delta F$, $\Delta Z_x(\Delta F)$, which in the case of the preferred differential impedance discussed above, may be represented as:

$$\Delta Z_x(\Delta F) = \frac{E_{x,e-w}(\Delta F)}{H_{x,e-w}(\Delta F)} - \frac{E_{x,v}(\Delta F)}{H_{x,v}(\Delta F)}$$

The frequency range $\Delta F$ preferably is at least as large as the actual resolution of the frequency filter. That is, the frequency range $\Delta F$ is sufficiently large to encompass data corresponding to at least one, and preferably two frequency windows $\Delta f$ used to filter the data and, when interpolation has been used in the frequency filtering, it will encompass at least one and preferably at least two actual data points. Preferably, the frequency ranges $\Delta F$ overlap.

The average differential impedances $\Delta Z_x(\Delta F)$ values for all pulses in each range of frequency $\Delta F$ are sorted or otherwise analyzed to determine whether they meet defined threshold criteria. Preferably the thresholds are based on a statistical measure of the average differential impedances, such as the median, mean, or maximum average differential impedance of the pulses. Excellent results have been obtained by defining the thresholds by reference to the median or mean average differential impedance. For example, upper and lower thresholds may be set equal to the mean average differential impedance plus and minus a deviation factor. The deviation factor may be arbitrary or it may be based on the standard deviation or some other factor. Generally, it is expected that thresholds of from about 1 to about 5 sigma from the mean average differential impedance will provide satisfactory results. Various bins then may be defined within the threshold limits, and the pulses within the bins analyzed to determine resistance values.

In any event, the pulses that do not meet the defined threshold criteria are eliminated, generating a subset K of pulses which are subjected to further analysis. Specifically, the average differential impedances over $\Delta F$ of all pulses k in subset K may be stacked to determine an average differential impedance for each location which correlates to resistivity at the corresponding depth. In the case of the preferred differential impedance discussed above, the average differential impedances over $\Delta F$ of pulses in subset K, $\Delta Z_K(\Delta F)$, may be represented as follows:

$$\Delta Z_x(\Delta F) = \sum_{k=1}^{K} \frac{\left[ \frac{E_{k,e-w}(\Delta F)}{H_{k,e-w}(\Delta F)} - \frac{E_{k,v}(\Delta F)}{H_{k,v}(\Delta F)} \right]}{K}$$

While such averaging has provided excellent results, other statistical analyses may be applied to pulses, with or without eliminating pulses which do not meet threshold criteria. For example, a median may be determined. Other statistical measures may be tested with routine effort, however, and may be found to correlate to resistivity as well.

Since the statistical analysis that provides the best correlation to actual values, or that may provide a display that may be interpreted easily may vary from data set to data set or by survey area, preferably the data are analyzed in various ways to optimize the statistical analysis. For example, variation of the thresholds and the bins, and analysis of various bins, will generally be desired to ascertain the bin that, when analyzed, yields values most closely correlated to resistance and most improves the contrast and signal to noise ratio. Regardless, it will be appreciated that by utilizing appropriate thresholds and bins the quality of the signal may be improved significantly.

It also will be appreciated, of course, that the exact design of the foregoing statistical analyses may be varied greatly within the scope of the subject invention. The selection of appropriate factors and parameters for such analyses is well within the skill of workers in the art and will depend on the quantity and quality of the data set that is being processed.

It also will be appreciated that the resistance values determined in accordance II with the novel methods do not measure actual resistivity. Instead, the methods of the subject invention more accurately measure the relative resistivity of the earth at various depths of interest. The relative resistance values are indicative of the presence or absence of deposits such as hydrocarbons and the like, and because the novel methods more accurately measure relative resistivities, those deposits may be identified with greater certainty and accuracy. Of course, if so desired, the relative resistivities determined in accordance with the subject invention may be scaled to more accurately reflect actual resistivities.

Display of Resistivity Values

Preferably, for example as shown in step 9 of FIG. 1, the resistivity values are displayed for visual analysis in an appropriate format, such as a two or three dimensional plot of resistivity versus depth. A gain factor may be applied to the resistance values for each location to scale the values for variation in amplitude attributable to depth, such variation largely consisting of attenuation of lower frequency signals.

That aids in interpreting displayed data as it effectively scales the display to account for such differences.

Any number of gain factors may be designed and applied for such purposes. Excellent results have been observed by applying gain factors to the resistivity values that are normalized and inversely proportional to the bandwidth of the filter at the frequency corresponding to the depths of interest. Thus, greater depths where narrow bandwidth filters were applied will have larger gain factors, and vice versa for shallower depths where larger bandwidth filters were applied.

The methods of the subject invention preferably are implemented by computers and other conventional data processing equipment. Suitable software for doing so may be written in accordance with the disclosure herein. Such software also may be designed to process the data by additional methods outside the scope of, but complimentary to the novel methods. Accordingly, it will be appreciated that suitable software will include a multitude of discrete commands and operations that may combine or overlap with the steps as described herein. Thus, the precise structure or logic of the software may be varied considerably while still executing the novel processes.

The order of many of the steps may be altered as will be appreciated by workers in the art. For example, it generally is advantageous to identify pulses prior to frequency filtering as that is computationally more efficient. Pulses could be identified after in data which has been frequency filtered. Also, many of the pre-processing steps, such as application of a filter to eliminate 60 Hz and harmonic frequencies may be applied during the collection of the data such that filtered data is recorded for subsequent processing.

The invention and its advantages may be further understood by reference to the following example. It will be appreciated, however, that the invention is not limited thereto.

EXAMPLE

A magnetotelluric survey was conducted in a known oil and gas producing field near Madisonville, Tex. Magnetic data were collected at a single location using a three-channel antenna oriented orthogonally in vertical, north-south, and east-west vectors. The data were recorded and digitally stored using a high gain audio amplifier and a laptop computer utilizing a DSP acquisition system, all of which are commercially available and typical of the equipment that may be used in gathering and processing magnetotelluric data. The data were sampled at a rate of 30,702 Hz. Approximately 500 pulses were recorded in response to thresholds triggered on the vertical channel. The thresholds were set at 6 sigma from the mean absolute value of the amplitude level, and the pulses were recorded as 4,096 24-bit samples. The range of depth investigated was from 6,000 to 12,000 feet at a resolution of 20 feet.

Each pulse was filtered to remove 60 Hz and harmonics and frequencies outside the range of interest, windowed using a Hamming window, power normalized, and time aligned. The pulse data were then horizontally mapped, and based thereon, pulses outside of the {−,−,−} quadrant were eliminated. The remaining peaks were subject to thresholds in the horizontal components. Specifically, peaks falling with −0.2 to 20 sigma from the mean absolute value of the amplitude level were retained. This yielded approximately 100 peaks for subsequent analysis.

Synthetic electric fields for each vector component of the magnetic pulse were generated by multiplying a Fourier transform of a filtered unit pulse with a low order estimate of the magnetic pulse generated by Prony's method. The magnetic pulses then were transformed with a Fourier transform.

The differential impedance of each pulse was averaged across each frequency window $\Delta F$. Pulses which did not meet defined threshold criteria, namely those ranging from 1 to 5 sigma from the mean absolute value of the amplitude level, were eliminated, leaving approximately 20 pulses for further analysis. Those average differential impedances across each frequency window for the remaining pulses were stacked to generate an average differential impedance for the pulses. This value was correlated to resistance at the various depths.

Figure 2:
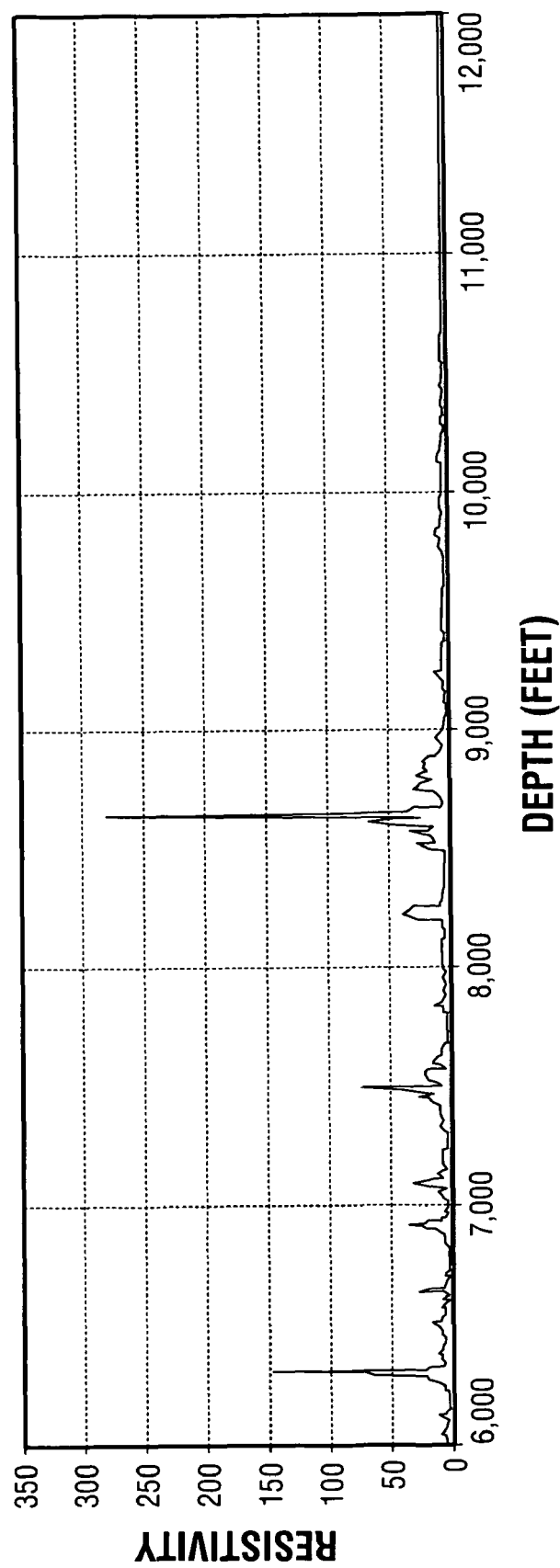
FIG. 2 is a plot of relative resistivity values at various depths in the vicinity of the known oil well as determined by the methods of the Example described below.
Figure 3:
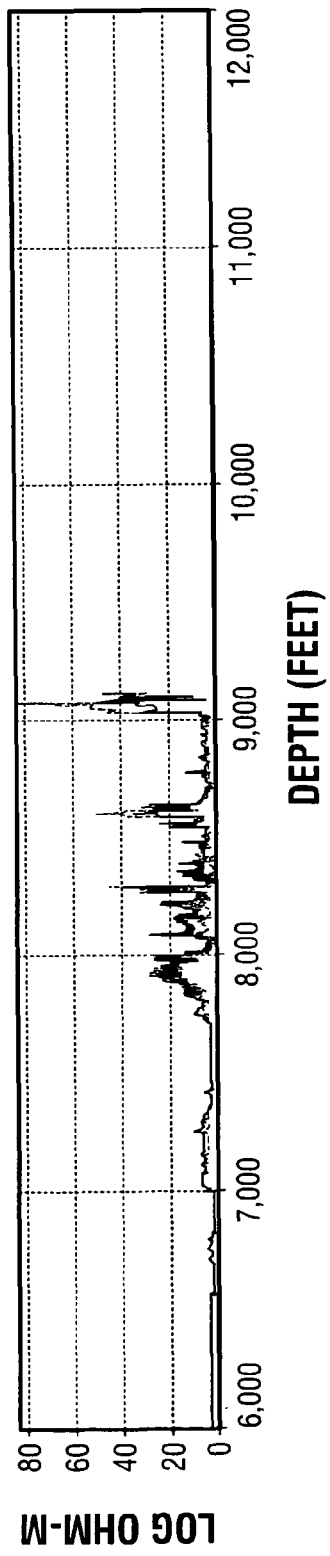
FIG. 3 (prior art) is a plot showing the measured resistivity over depth of a known oil well.
Figure 4:
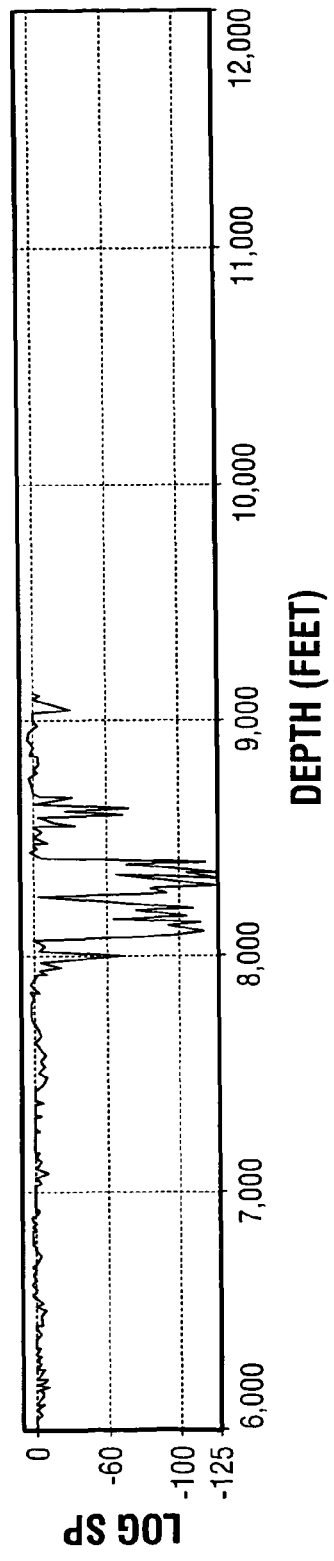
FIG. 4 (prior art) is a plot showing the spontaneous potential curve of the known oil well.

A plot of the resistivity values thus determined versus depth at the measured location is shown in FIG. 2. The location is in the vicinity of a known oil well, and thus this plot may be compared to a plot of measured resistivity and the spontaneous potential curve for the oil well, which are depicted respectively in FIGS. 3 and 4. As may be seen therefrom, a peak corresponding to the presence of a known pay zone at 8,700 feet is shown clearly in FIG. 2. It should be noted that the peaks at 6,300 and 7,500 feet in FIG. 2 are phantom images which do not reflect the presence of hydrocarbons and which reflect modulation noise from a nearby 440 volt 3-phase power line.

The foregoing example demonstrates the improved processing of magnetotelluric data by the novel methods and thus, that the novel methods ultimately allow for more accurate inferences about the depth and location of hydrocarbons and other valuable natural resources having contrasting resistivities.

While this invention has been disclosed and discussed primarily in terms of specific embodiments thereof, it is not intended to be limited thereto. Other modifications and embodiments will be apparent to the worker in the art.

What is claimed is:

1. A method of processing magnetotelluric data to identify subterranean deposits, wherein said data comprise the amplitude of alternating magnetic or electrical fields recorded over time in at least two vector components at one or more locations in an area of interest, said method comprising:

(a) identifying amplitude pulses in said data, said pulses being time segments comprising an amplitude peak meeting defined threshold criteria in at least one said vector component;

(b) filtering said pulses at a set of predetermined frequencies to separate amplitude data at each said frequency from the remainder of the amplitude data in said pulses, wherein said frequencies correspond to subterranean depths over a range of interest; and (c) statistically analyzing a differential impedance $\Delta Z$ of said pulses at each said frequency at each said location to determine a value correlated to the resistance of the earth at each said frequency, the resistance being indicative of the presence or absence of deposits at the corresponding subterranean depth at the location; wherein differential impedances of a given pulse x, $\Delta Z_x(f)$, are defined as follows:

$$\Delta Z_x(f) = \left( A_n \frac{E_{x,n}(f)}{H_{x,n}(f)} + A_{n+1} \frac{E_{x,n+1}(f)}{H_{x,n+1}(f)} + \ldots + A_N \frac{E_{x,N}(f)}{H_{x,N}(f)} \right) - \left( A_m \frac{E_{x,m}(f)}{H_{x,m}(f)} + A_{m+1} \frac{E_{x,m+1}(f)}{H_{x,m+1}(f)} + \ldots + A_M \frac{E_{x,M}(f)}{H_{x,M}(f)} \right)$$

where $\Delta Z_x(f)$ is the differential impedance of pulse x;

$E_{x,n}(f)$ through $E_{x,N}(f)$ and $E_{x,m}(f)$ through $E_{x,M}(f)$ are the recorded or synthetic electric fields for vector components n through N and m through M of pulse x;

$H_{x,n}(f)$ through $H_{x,N}(f)$ and $H_{x,m}(f)$ through $H_{x,M}(f)$ are the recorded or synthetic magnetic field for vector components n through N and m through M of pulse x;

$$\frac{E_{x,n}(f)}{H_{x,n}(f)} \text{ through } \frac{E_{x,N}(f)}{H_{x,N}(f)} \text{ and } \frac{E_{x,m}(f)}{H_{x,m}(f)} \text{ through } \frac{E_{x,M}(f)}{H_{x,M}(f)}$$

are the impedances for vector components n through N and m through M of pulse x; and $A_n$ through $A_N$ and $A_m$ through $A_M$ are complex scaling factors applied to the impedances for vector components n through N and m through M of pulse x.

2. The method of claim 1, wherein said magnetotelluric data comprise the amplitude of the magnetic field recorded over time, and synthetic electric field data are generated based on the recorded magnetic field data, said synthetic electric field data being amplitude data over a range of frequencies.

3. The method of claim 2, wherein said synthetic electric field data are generated by
(a) transforming a unit electrical impulse with a Fourier transform;
(b) generating low order estimates of the frequency response of recorded magnetic pulse data; and
(c) multiplying the Fourier transform of the processed unit pulse by the low order estimates.

4. The method of claim 1, wherein said magnetotelluric data comprise the amplitude of the electric field recorded over time, and synthetic magnetic field data are generated based on the recorded electric field data, said synthetic magnetic field data being amplitude data over a range of frequencies.

5. The method of claim 1, wherein said magnetotelluric data comprise the amplitude of both the magnetic and electric fields recorded over time.

6. The method of claim 1, wherein said magnetotelluric data are recorded over time in a vertical and a horizontal component.

7. The method of claim 6, wherein said pulses have an amplitude peak meeting defined threshold criteria in their corresponding vertical vector component.

8. The method of claim 1, wherein said magnetotelluric data are recorded over time in a vertical and two horizontal components.

9. The method of claim 1, wherein said vector components are orthogonally oriented relative to each other.

10. The method of claim 1, wherein said vector components comprise a vertical component, a north-south component, and an east-west component.

11. The method of claim 1, wherein said data are obtained and said pulses are identified by receiving the amplitude of magnetotelluric signals in at least two vector components and recording said magnetotelluric signals over a plurality of time segments, said time segments being recorded in response to the detection of amplitude peaks meeting defined threshold criteria in at least one said vector component.

12. The method of claim 11, wherein said pulses have an amplitude peak meeting defined threshold criteria in a second vector component.

13. The method of claim 1, wherein said data are filtered by transforming the data from the amplitude-time domain to the magnitude-phase/frequency domain using a fast Fourier transform, thereby defining frequency windows, $\Delta f$, which correspond to particular depths at a particular location.

14. The method of claim 1, wherein the differential impedance of amplitude at each frequency is based on the impedances of a vertical channel and at least one horizontal channel.

15. The method of claim 1, wherein a differential impedance $\Delta Z$ of said pulses at each said frequency is analyzed by:
(a) statistically analyzing a differential impedance of each pulse over $\Delta F$;
(b) eliminating pulses in which the analyzed differential impedances do not satisfy predetermined threshold criteria, thereby generating a subset of pulses I for each $\Delta F$; and
(c) statistically analyzing a differential impedance of each pulse in subset I over $\Delta F$.

16. The method of claim 1, wherein the differential impedance $\Delta Z$ of said pulses at each said frequency is analyzed by:
(a) determining an average differential impedance of each pulse over $\Delta F$;
(b) eliminating pulses in which the average differential impedances do not satisfy predetermined threshold criteria, thereby generating a subset of pulses I for each $\Delta F$; and
(c) determining an average differential impedance for pulses in subset I over $\Delta F$.

17. The method of claim 1, further comprising displaying said resistivity values.

18. A method of transforming data representing magnetotelluric fields above an area of interest on the earth to values representing the resistivity of the earth at various depths below said area of interest, wherein said data comprise the amplitude of alternating magnetic or electrical fields over time in at least two vector components at one or more locations in said area of interest, said method comprising:
(a) identifying amplitude pulses in said data, said pulses being time segments comprising an amplitude peak meeting defined threshold criteria in at least one said vector component;
(b) filtering said pulses at a set of predetermined frequencies to separate amplitude data at each said frequency from the remainder of the amplitude data in said pulses, wherein said frequencies correspond to subterranean depths over a range of interest; and
(c) statistically analyzing differential impedance $\Delta Z$ of said pulses at each said frequency at each said location to determine said values correlated to the resistance of the earth at said subterranean depths in said area of interest, the resistance being indicative of the presence or absence of deposits at the corresponding subterranean depth at the location; wherein differential impedances of a given pulse x, $\Delta Z_x(f)$, are defined as follows:

$$\Delta Z_x(f) = \left( A_n \frac{E_{x,n}(f)}{H_{x,n}(f)} + A_{n+1} \frac{E_{x,n+1}(f)}{H_{x,n+1}(f)} + \ldots + A_N \frac{E_{x,N}(f)}{H_{x,N}(f)} \right) - \left( A_m \frac{E_{x,m}(f)}{H_{x,m}(f)} + A_{m+1} \frac{E_{x,m+1}(f)}{H_{x,m+1}(f)} + \ldots + A_M \frac{E_{x,M}(f)}{H_{x,M}(f)} \right)$$

where $\Delta Z_x(f)$ is the differential impedance of pulse x;

$E_{x,n}(f)$ through $E_{x,N}(f)$ and $E_{x,m}(f)$ through $E_{x,M}(f)$ are the recorded or synthetic electric fields for vector components n through N and m through M of pulse x;

$H_{x,n}(f)$ through $H_{x,N}(f)$ and $H_{x,m}(f)$ through $H_{x,M}(f)$ are the recorded or synthetic magnetic field for vector components n through N and m through M of pulse x;

$\frac{E_{x,n}(f)}{H_{x,n}(f)}$ through $\frac{E_{x,N}(f)}{H_{x,N}(f)}$ and $\frac{E_{x,m}(f)}{H_{x,m}(f)}$ through $\frac{E_{x,M}(f)}{H_{x,M}(f)}$ are the impedances for vector components n through N and m through M of pulse x; and $A_n$ through $A_N$ and $A_m$ through $A_M$ are complex scaling factors applied to the impedances for vector components n through N and m through M of pulse x.

19. The method of claim 18, wherein said method further comprises displaying said resistivity values for visual analysis and enhanced interpretation thereof.

20. The method of claim 18, wherein said magnetotelluric data comprise the amplitude of the magnetic field recorded over time, and synthetic electric field data are generated based on the recorded magnetic field data, said synthetic electric field data being amplitude data over a range of frequencies.

21. The method of claim 18, wherein said magnetotelluric data comprise the amplitude of the electric field recorded over time, and synthetic magnetic field data are generated based on the recorded electric field data, said synthetic magnetic field data being amplitude data over a range of frequencies.

22. The method of claim 21, wherein said synthetic electric field data are generated by
 (a) transforming a unit electrical impulse with a Fourier transform;
 (b) generating low order estimates of the frequency response of recorded magnetic pulse data; and
 (c) multiplying the Fourier transform of the processed unit pulse by the low order estimates.

23. The method of claim 18, wherein said magnetotelluric data comprise the amplitude of both the magnetic and electric fields recorded over time.

24. The method of claim 18, wherein said magnetotelluric data are recorded over time in a vertical and a horizontal component.

25. The method of claim 18, wherein said magnetotelluric data are recorded over time in a vertical and two horizontal components.

26. The method of claim 25, wherein said pulses have an amplitude peak meeting defined threshold criteria in their corresponding vertical vector component.

27. The method of claim 25, wherein said pulses have an amplitude peak meeting defined threshold criteria in a second vector component.

28. The method of claim 18, wherein the differential impedance of amplitude at each frequency is based on the impedances of a vertical channel and at least one horizontal channel.

29. The method of claim 18, wherein a differential impedance $\Delta Z$ of said pulses at each said frequency is analyzed by:
 (a) statistically analyzing a differential impedance of each pulse over $\Delta F$;
 (b) eliminating pulses in which the analyzed differential impedances do not satisfy predetermined threshold criteria, thereby generating a subset of pulses I for each $\Delta F$; and
 (c) statistically analyzing a differential impedance of each pulse in subset I over $\Delta F$.

30. The method of claim 18, wherein the differential impedance $\Delta Z$ of said pulses at each said frequency is analyzed by:
 (a) determining an average differential impedance of each pulse over $\Delta F$;
 (b) eliminating pulses in which the average differential impedances do not satisfy predetermined threshold criteria, thereby generating a subset of pulses I for each $\Delta F$; and
 (c) determining an average differential impedance for pulses in subset I over $\Delta F$.

* * * * *